May 13, 1941. G. L. HINEMAN 2,242,125
UNDERCARRIAGE MECHANISM FOR VEHICLES
Filed Oct. 27, 1938 3 Sheets-Sheet 1
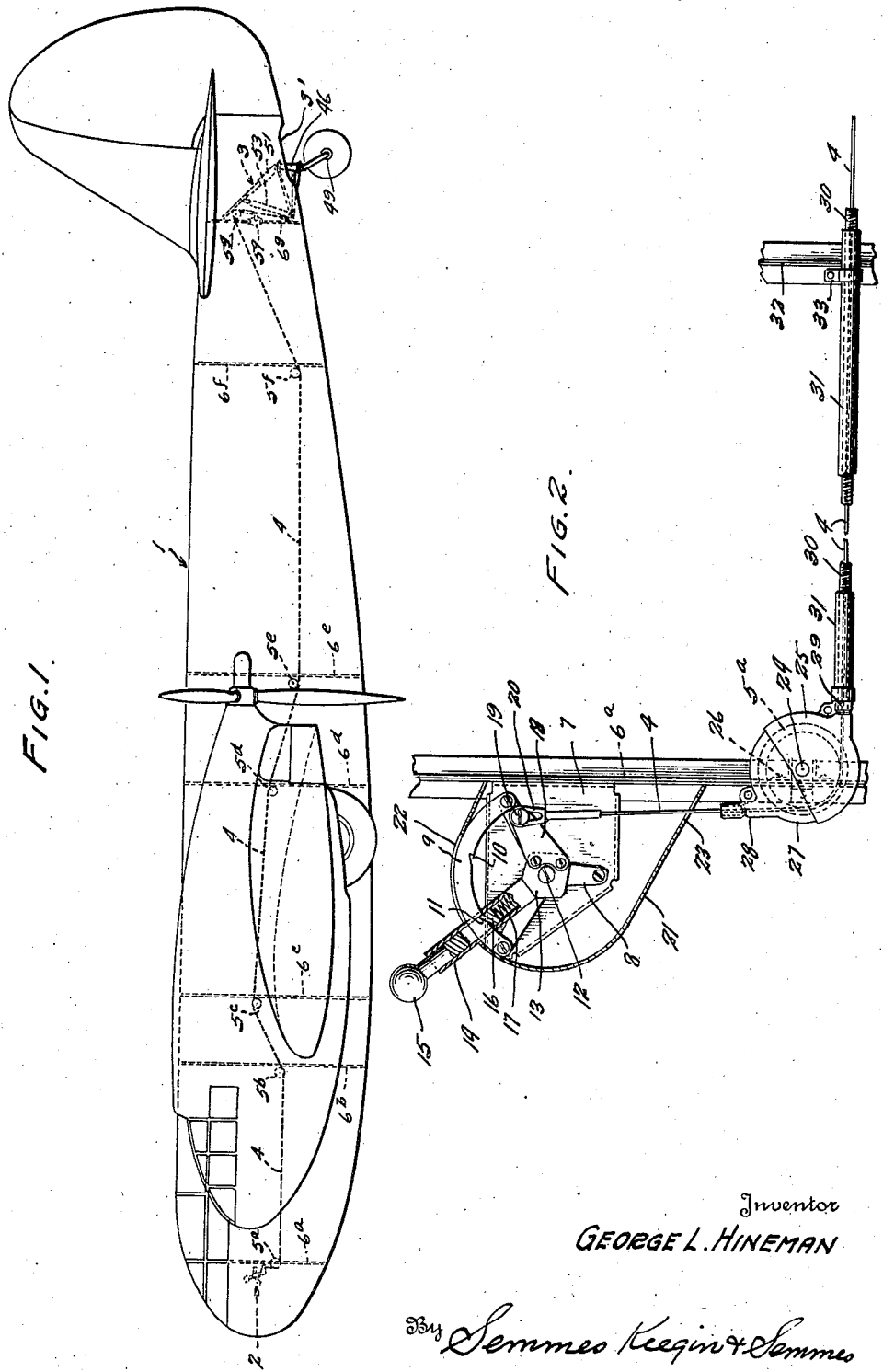
Inventor
GEORGE L. HINEMAN
By Semmes Keegin & Semmes
Attorneys May 13, 1941.  G. L. HINEMAN  2,242,125
UNDERCARRIAGE MECHANISM FOR VEHICLES
Filed Oct. 27, 1938   3 Sheets-Sheet 2
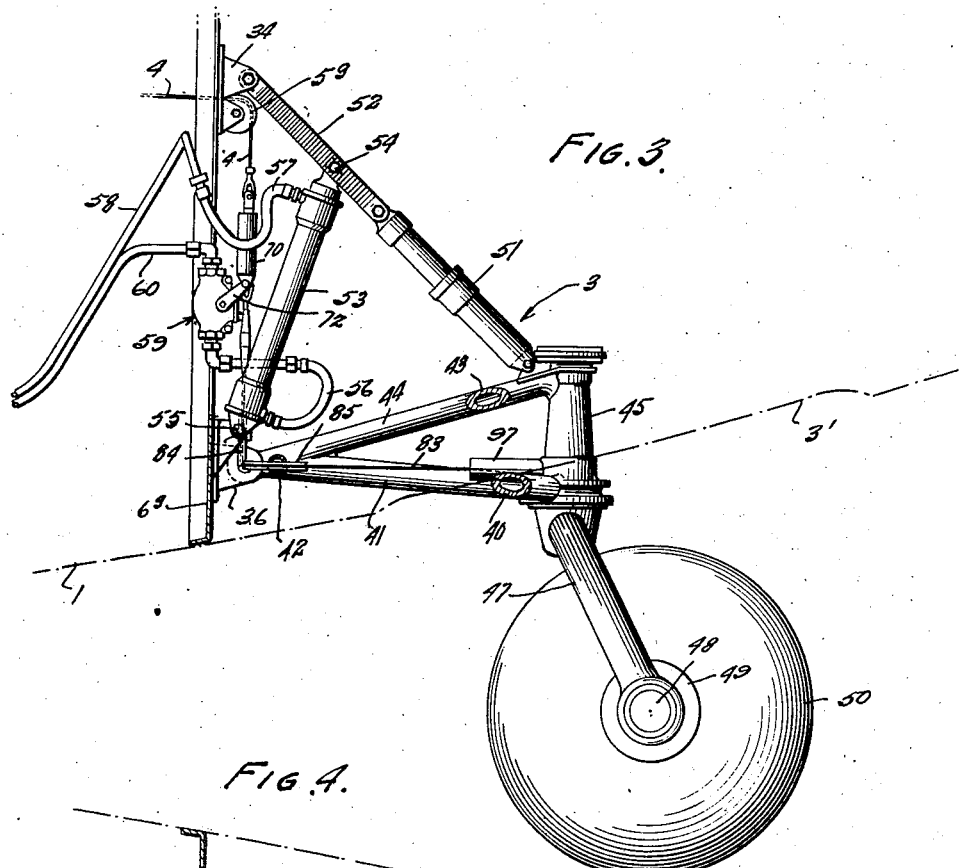
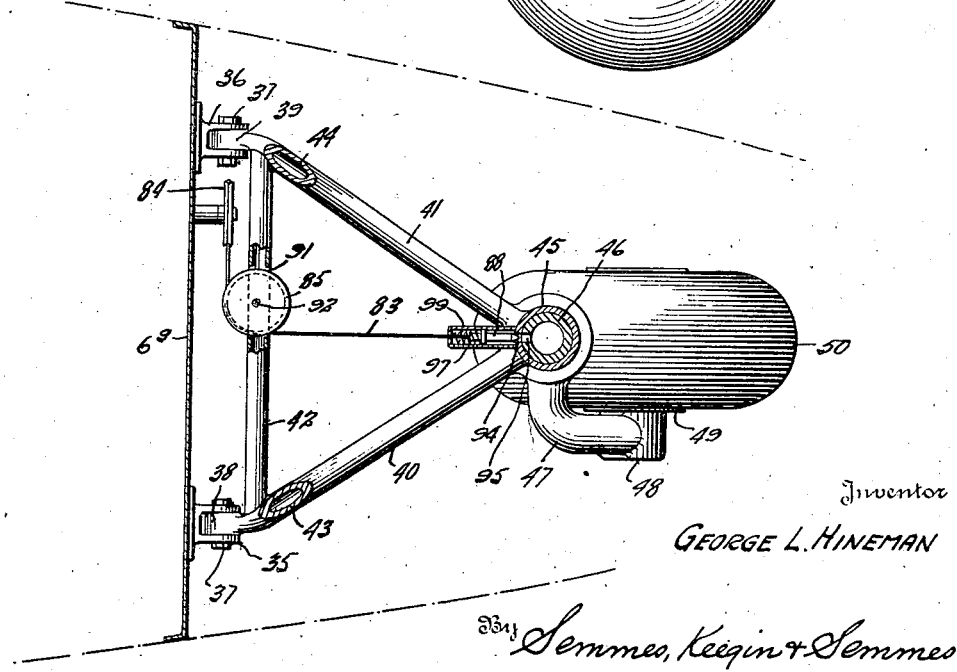
Inventor
GEORGE L. HINEMAN
By Semmes, Keegin & Semmes
Attorneys

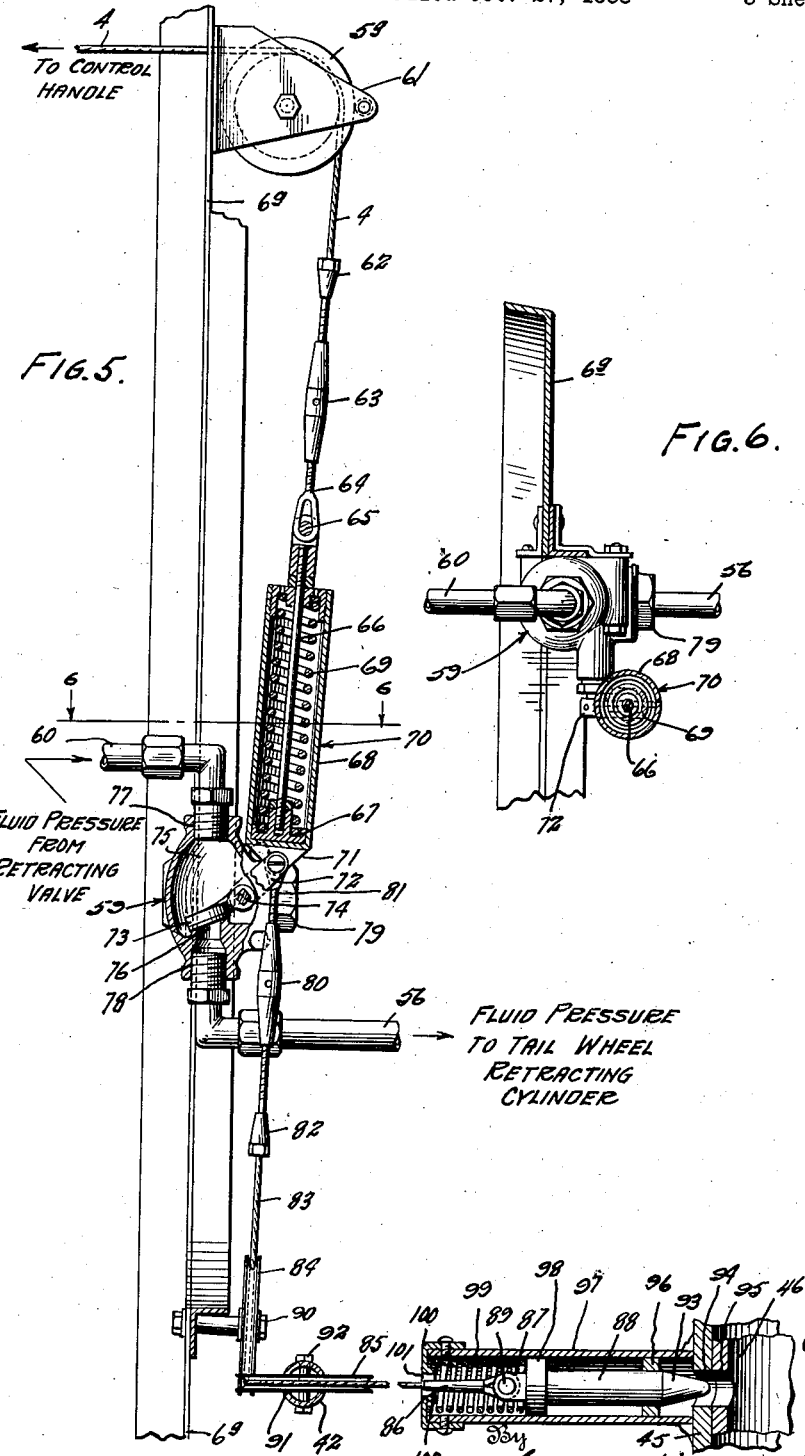

Patented May 13, 1941

2,242,125

UNITED STATES PATENT OFFICE 2,242,125

UNDERCARRIAGE MECHANISM FOR VEHICLES

George L. Hineman, Buffalo, N. Y., assignor to Bell Aircraft Corporation, Buffalo, N. Y., a corporation of New York Application October 27, 1938, Serial No. 237,338

7 Claims. (Cl. 244—102)

The present invention relates generally to vehicle assemblies and more specifically has reference to means whereby the airplane tail wheel can be secured in position for landing and take-off. While I have shown and described my invention in connection with a tail wheel assembly, it is, of course, to be understood that it is not to be limited to this particular construction and can be employed with equal advantage in connection with any type of wheel which is adapted to swivel.

An object of the present invention is to provide a tail wheel construction which is prevented from retracting unless it is secured in position to clear the fuselage.

Another object of the present invention is to provide a tail wheel structure which will prevent injury to either the tail wheel or the fuselage.

Yet another object of the present invention is to provide a construction which is simple in construction and operation, whereby the tail wheel may be secured in a position for either landing or take-off.

Yet a still further object of the present invention is to provide a simple and positive means for securing a tail wheel in proper position when a hydraulic retracting system is employed.

Yet a further object of the present invention is the provision of a tail wheel assembly which is light in weight and easy to operate.

To accomplish the above and other important objects, the present invention embraces the idea of providing a check valve which will control the flow of oil to the tail wheel retracting cylinder. The valve is held in its opened and closed positions by means of a control actuated by the pilot of the ship. When the valve is in its open position, a plunger which engages the spindle of the tail wheel is moved clear of the tail wheel spindle, enabling it to rotate 360°. On the other hand, when the valve is in its closed position, the spindle is engaged by the plunger locking it against rotation. At the same time, the oil admitted into the check valve will be passed to the wheel retracting cylinder and the tail wheel can, therefore, move into its well in the fuselage.

Referring now to the drawings in which like numerals designate similar parts:

Figure 1 is a side elevational view of an airplane equipped with my invention.

Figure 2 is a fragmental sectional view of the manually operated control.

Figure 3 is a fragmental view in side elevation of a tail wheel construction provided with my invention.

Figure 4 is a top view partly in section of the construction shown in Figure 3.

Figure 5 is a fragmental sectional view of the structure by which the tail wheel is locked in position.

Figure 6 is a view taken along line 6—6 of Figure 5.

Referring to Figure 1, I have shown in a double nacelled airplane, chosen for purposes of illustration, a fuselage 1 containing in its forward compartment a hand control referred to generally as 2. In the tail portion of the fuselage 1 is a tail-wheel support and retraction assembly referred to generally as 3. Assembly 3 is positioned for retraction into slot 3' at the tail of the fuselage. Operatively connecting control 2 and assembly 3 is an operating cable 4 suitably guided as by pulley-wheels 5a to 5g supported at bulkheads 6a to 6g, respectively.

As shown in Figure 2, the hand control 2 comprises a support member 7 conveniently attached as to bulkhead 6a extending forwardly and carrying bracing plate 8, which in turn carries a latch plate 9 of arc shaped construction in line with the longitudinal axis of the airplane. Latch plate 9 has at its inner arcuate edge notches 10 and 11, having their steep sides towards the rear of the fuselage and their sloping sides towards the front of the fuselage, notch 10 being positioned rearwardly of notch 11 on latch plate 9. Pin 12 is carried by bracing plate 8 and, in turn, pivotally supports bell crank 13 having tubular handle 14 and gripping knob 15. Latching plate 9 passes through appropriate slots in the walls of tubular handle 14, and detent 16, upwardly urged by spring 17, is adapted to engage notches 10 and 11, and, in Figure 2, is shown engaging notch 11. Forming a part of bell crank 12 is lateral extension 18 having headed pin 19 screwed into an appropriate threaded aperture. Pin 19 carries eye-bolt 20 secured to the end of cable 4. A suitable shield 21 is provided to protect the hand control 2 and has an appropriate slot 22 for permitting movement of arm 14. Also, shield 21 has an aperture 23 at its lower portion for permitting passage therefrom of cable 4.

In changing from downward to rearward direction, cable 4 passes over pulley wheel 5a shown in dotted lines. Axle 24 supports pulley wheel 5a and is journaled in casing 25 surrounding pulley wheel 5a and secured by appropriate clamping means 26, indicated by dotted lines to bulkhead 6a. A supplementary casing 27 fitting under the edges of casing 25 is swingably mounted upon the axle 24 to complete the casing structure surrounding pulley wheel 5a. Supplementary casing 27 has integrally formed with it a guide aperture 28, causing the supplementary casing 27 to pivot in line with the upright portion of cable 4 as it moves angularly under the guidance of lateral extension 19. Integrally formed with casing 25 is a guide aperture 29 terminating in a suitable exteriorly threaded collar to receive and be attached to cable spring casing 30 and protective tubing 31. Suitable means for securing protective tubing 31 to formers 32 such as clamps 33 are utilized.

The tail-wheel support and retraction assembly 3 comprises, as shown in Figures 3 and 4, an upper attachment ear support 34 and lower attachment ear supports 35 and 36 for securing the assembly 3 to the bulkhead 6g. Held in ear supports 35 and 36 by lock bolts 37 are eye extensions 38 and 39 formed on the ends of tubular members 40 and 41. Members 40 and 41 are joined to each other and a tubular member 42 in delta formation. Tubular members 43 and 44 branch upwardly and rearwardly from the eye extension ends of members 40 and 41 and join each other at their opposite ends above members 40 and 41 in an apex having the same angle as that formed by members 40 and 41. Carried by members 40, 41, 43, and 44 at their ends farthest from eye extensions 37 and 38 is bearing sleeve 45, having an axis parallel to bulkhead 6g when assembly 3 is in extended position. Fitting in bearing sleeve 45 is spindle 46, suitably secured against longitudinal displacement and carrying offset member 47, which supports axle 48 journaled in tail wheel 49, which carries the tail wheel tire 50.

Hingeably connecting with the apex of members 43 and 44 is shock strut 51 hingeably attached at its opposite end with link 52, which connects members 43 and 44 to ear support 34. When the tail wheel assembly 3 is in extended position, shock strut 51 and link 52 are in line for resisting any upward movement of sleeve 45. A double acting hydraulic cylinder and piston 53 is attached to link 52 between its two ends and near the end adjoining shock strut 51 as by bolt 54.

Hydraulic member 53 is hingeably connected at its lower and opposite end to support member 55 secured to bulkhead 6g. Suitable flexible connections as tubes 56 and 57 connect opposite ends of the hydraulic member for supplying and withdrawing actuating fluid. Tube 57 at the top of member 53 connects with hydraulic piping 58. Tube 56 connects through a check valve indicated generally as 59 to piping 60. Piping 58 and 60 preferably extend forwardly of the fuselage to the pilot's compartment near the hand control tube and connect to a suitable double acting valve control, not shown, and a source of fluid pressure and fluid reservoir, also not shown.

Referring to Figures 3, 4, 5, and 6, it can be seen that the operating cable 4 carries past bulkhead 6g on pulley wheel 5g supported on ear bracket 61 and turns downward toward check valve 59. As shown in Figure 5, the rearward end of cable 4 terminates in gripping sleeve 62 attaching cable 4 to turn buckle 63 which in turn connects with eye bolt 64. Eye bolt 64 is secured by pin 65 to rod 66 and plunger 67 traveling in cylinder 68 and downwardly urged in relation to cylinder 68 by spring 69, forming a spring link which may be designated generally as 70. Extension 71 at the bottom of link member 70 is hingeably attached to an arm 72 operatively attached to a disc member 73 by means of a bolt 74. Arm 72 and disc 73 constitute the moving parts of the check valve 59 having chamber 75, valve seat 76 and inlet and exit apertures 77 and 78. Plug 79 enables access to the inner parts of check valve 59.

Pivotally connecting arm 72 and a second turn buckle 80 is eye bolt 81. Also threaded into turn buckle 80 is a cable terminal connector 82 joined to cable 83 which extends over pulley wheels 84 and 85 to terminal eye connector 86 linked to the ear extension 87 of locking pin 88 by bolt 89. Pulley 84 is suitably carried by axle 90 secured as by bolting to bulkhead 6g, pulley wheel 84 being positioned in a plane roughly parallel to bulkhead 6g. As shown in Figures 4 and 5, pulley wheel 85 is secured in slot 91 of tubular member 42 by axle member 92. Pulley wheel 85 is placed with its axis roughly parallel to that of spindle 46 carrying the tail wheel 49.

Locking pin 88 has a tapered portion 93 at its locking end adapted to pass through aperture 94 in bearing sleeve 45 and aperture 95 in spindle 46. Locking pin 88 is guided by sleeve 96 in cylinder 97 which is suitably attached as by welding to bearing sleeve 46. Also, locking pin 88 has a collar 98 of almost the same diameter as that of the interior of sleeve 97. Locking pin 88 is constantly urged in the direction of spindle 46 by spring 99 acting against collar 98 and held in place by cap 100 suitably secured to the end of sleeve 97 away from bearing 45. Spring 99 is weaker than spring 69 in spring link 70, which overrides spring 99. Cap 100 has a central aperture 101 bounded by inturned edges 102.

As a modification of the invention, spindle 46 may be held in sleeve 45 by suitable collars allowing a limited downward longitudinal play of spindle 46 to bring apertures 94 and 95 out of line with each other. A constant tension member, such as a coil spring, would press downwardly upon spindle 46 to normally hold apertures 94 and 95 in line. Pressure of the fuselage weight acting upon the sleeve 45 against spindle 46 supported through the tail wheel 49 by the earth, would prevent, however, any alignment of apertures 94 and 95 while the airplane is maneuvering on the ground.

In operation, the tail wheel locking device is used in conjunction with the hydraulic cylinder control. For purposes of illustration I have considered the hydraulic cylinder 53 as operated by a double acting valve. Assuming the tail wheel assembly to be in extended position and the locking pin 88 to be in withdrawn position, the check valve must be in closed position, regardless of the position of the hand grip 15, because of spring link 70. Unless the circular aperture 95 coincides with the circular aperture 94, pin 88 cannot enter aperture 95 and lock spindle 46 in retractible position in line with the fuselage opening. Unless disc 76 is moved to its open position no passage of fluid into the cylinder 53 is possible for retracting the tail wheel assembly. Consequently it can be seen that regardless of the positions of control knob 15 or the double acting hydraulic valve for controlling the hydraulic cylinder 53, no retraction of the tail wheel assembly is possible until the tail wheel 49 is aligned with the slot 3' for receiving it.

In order to retract the tail wheel into the slot 3' the operator would turn the hydraulic control valve to that position passing fluid under pressure to the check valve and would also move the control knob 15 from the forward notch position as shown in Figure 2 to the rearward notch position. Since this would allow the cable 4 to pass rearwardly under the influence of spring connection 70, the cable 4 and the plunger 67 would assume the positions shown in Figure 5. Then, in case the air stream had not already aligned the tail wheel with the slot 3' so as to align the apertures 94 and 95 and permit the entrance of locking pin 88, the pilot could do so by slight maneuvering of the airplane. Variations in the forces of wind pressure or of inertia would cause such alignment. Upon the entrance of pin 88 through aperture 95, cable 83 would move toward spindle 46 carrying with it arm 72 and pulling sleeve 68 of spring connector 70 with it. Downward movement of arm 72 carries disc 73 upward away from valve seat 76 through the medium square pin 74. Because of disc 73 moving into open position fluid pressure is allowed to reach the tail wheel retracting cylinder and the tail wheel assembly then moves upward into slot away from the air stream.

When the tail wheel is in retracted position and it is desired to extend the tail wheel and unlock its spindle 46 for landing, the operator moves the retracting valves into a position furnishing a flow of pressure fluid through the piping 60 until the tail wheel is extended. Then the operator moves the control knob 15 from locked position adjacent notch 10 to swivel position adjacent notch 11.

It will thus be seen that I have invented a simple but efficient mechanism to prevent the tail wheel from being retracted unless it is locked in position to clear the fuselage structure, thereby safeguarding both the tail wheel retracting assembly and the fuselage itself by permitting spindle 46 to ride upwardly in bearing 45 against the urging of a spring not shown. It can be seen that in one modification of my invention the weight of the fuselage will prevent alignment of the apertures 94 and 95 while the plane is on the ground, thus protecting the plane against retraction of the tail wheel while it is supporting weight.

It will also be seen that I have provided a mechanism for locking the tail wheel against retraction while landing and taking off. A further provision is made that retraction of the tail wheel is impossible while it is supporting weight.

It can also be seen that I have provided a simple and light-weight construction for safeguarding the operation of a retracting cylinder of conventional design while maintaining simplicity of construction and operation.

It will also be seen that the connecting controls and operating table are protected from moisture and foreign matter by a partially hingeable casing enclosing the front-most pulley wheel carrying and guiding the operating cable.

As before stated, this invention may be equally applied to other pivoting under carriage of a retractible nature and it is not to be limited to a tail wheel usage. Therefore, while I have shown and described the preferred embodiment of my invention, I do not confine myself to the precise details of construction herein set forth by way of illustration, as it is apparent that many changes and variations may be made therein, by those skilled in the art, without departing from the spirit of the invention, or exceeding the scope of the appended claims.

I claim:
1. In an under carriage for vehicles, a retractible frame, retracting means, means to block said retracting means, a sleeve carried by said frame, a spindle journalled in the sleeve, a vehicle supporting member attached to the spindle and adapted to receive support from a relatively moving surface, a locking member to prevent pivoting of the spindle in the sleeve, and remote control means for said locking member, said remote control member actuating said blocking means when said locking member is in inoperative position.

2. In a pivotable under carriage for vehicles, a retractible frame, fluid means for retracting said frame, a sleeve carried by said frame, a spindle journaled in the sleeve, a vehicle supporting member attached to the spindle and adapted to receive support from a relatively moving surface, said spindle and said sleeve having circular apertures capable of being aligned when the vehicle supporting member is properly aligned for retraction, a locking pin adapted to enter said apertures and spring urged for entry therein, a control cable resiliently connected to a control member away from the spindle, a check-valve operated by the control cable and having its closed position coinciding with the withdrawn position of the locking pin, said check valve being in series with the fluid circuit of said fluid retracting means, whereby said fluid retracting means may not be operated unless said support member is in aligned position.

3. In a pivotable under carriage for vehicles, a retractible frame, a sleeve carried by said frame, a spindle journaled in the sleeve, a vehicle supporting member attached to the spindle and adapted to receive support from a relatively moving surface, said spindle and said sleeve having circular apertures capable of being aligned when the vehicle supporting member is properly aligned for retraction, a locking pin adapted to enter said apertures and spring urged for entry therein, a control cable resiliently connected to a control member away from the spindle, a check-valve operated by the control cable and having its closed position coinciding with the withdrawn position of the locking pin, and double acting hydraulic means for retracting said frame operated through said check valve, whereby said hydraulic retracting means may not be operated unless said support member is in aligned position.

4. In a pivotable under carriage for vehicles, a supporting sleeve, a spindle journaled in the sleeve, a vehicle supporting member attached to the spindle and adapted to receive support from a relatively moving surface, a locking member spring urged toward locking position to prevent pivoting of the spindle in the sleeve, a linearly yielding spring link, and means to remotely control said locking member and connected therewith by said link, said spring link being capable of overriding the spring urged locking member.

5. In a pivotable under carriage for vehicles, a supporting sleeve, a spindle journaled in the sleeve, a vehicle supporting member attached to the spindle and adapted to receive support from a relatively moving surface, said spindle and said sleeve having circular apertures capable of being aligned when the vehicle supporting member is properly aligned with the fuselage, a locking pin adapted to enter said apertures and spring urged for entry therein, a control member away from the spindle, a linearly yielding spring link, a control cable connecting said pin to said control member through said spring link, a check-valve operated by the locking pin side of said link and having its closed position coinciding with the withdrawn position of the locking pin, double acting hydraulic means for retracting the vehicle support, said spring link being capable of overriding said pin, whereby said hydraulic retracting means may not be operated unless said support member is in aligned position, regardless of the position of the control member.

6. In a reciprocating cable control for airplanes, a structural member, a hinge member positioned for hinging in a vertical longitudinal plane, an under carriage carried by the hinge member, a reciprocating element carried on the free end of the under carriage, a pulley wheel carried by the under carriage having its operating perimeter tangential to the axis of hinging of the hinge member, a second pulley wheel carried by the structural member and having its operating perimeter tangential to said axis, a control member, a cable joined at one end to the control member and at the other end to said element, said cable being guided by said pulley wheels.

7. In a pivotable under carriage for airplane tail wheels, a supporting sleeve, a spindle journalled in the sleeve, a tail wheel attached to the spindle, said spindle and said sleeve having circular apertures capable of being aligned when the said wheel is properly aligned with the fuselage, a locking pin adapted to enter said apertures and a spring urging the same for entry therein, a double acting hydraulic means for retracting the said under carriage, a check valve to control the operation of said hydraulic means and having its closed position coinciding with the withdrawn position of the locking pin, a control cable operatively connecting said control member to the said check valve, and a second control cable connecting the said check valve to the locking pin, whereby said check valve may not be closed and said hydraulic retracting means operated unless the tail wheel is in aligned position so as to permit the locking pin to enter the said apertures.

GEORGE L. HINEMAN.